US012354485B2

(12) United States Patent
Altus et al.

(10) Patent No.: US 12,354,485 B2
(45) Date of Patent: Jul. 8, 2025

(54) SYSTEMS AND METHODS FOR MONITORING A FLIGHT PLAN OF AN AIRCRAFT

(71) Applicant: THE BOEING COMPANY, Chicago, IL (US)

(72) Inventors: Stephen Solomon Altus, Campbell, CA (US); William Jenden, Vancouver (CA); Michael Rowell, Castle Rock, CO (US); Anthony Bradford Coult, Excelsio, MN (US); Charles Taylor, Dallas, TX (US); Jason Aggarwal, Brighton & Hove (GB); Jonathan Geddes Cocks, Victoria (CA)

(73) Assignee: The Boeing Company, Chicago, IL (US)

( * ) Notice: Subject to any disclaimer, the term of this patent is extended or adjusted under 35 U.S.C. 154(b) by 291 days.

(21) Appl. No.: 17/653,667

(22) Filed: Mar. 7, 2022

(65) Prior Publication Data

US 2023/0282120 A1 Sep. 7, 2023

(51) Int. Cl.
*G08G 5/34* (2025.01)
*G08G 5/21* (2025.01)
*G08G 5/26* (2025.01)

(52) U.S. Cl.
CPC ................. *G08G 5/34* (2025.01); *G08G 5/21* (2025.01); *G08G 5/26* (2025.01)

(58) Field of Classification Search
None
See application file for complete search history.

(56) References Cited

U.S. PATENT DOCUMENTS

| | | | | |
|---|---|---|---|---|
| 6,922,631 | B1 * | 7/2005 | Dwyer | G01C 23/00 701/467 |
| 9,734,723 | B1 * | 8/2017 | Bruno | B64C 39/024 |
| 11,176,833 | B1 * | 11/2021 | McGaughy | G08G 5/025 |
| 11,380,208 | B1 * | 7/2022 | Moeykens | G08G 5/0069 |
| 11,572,183 | B1 * | 2/2023 | Overfield | G06Q 50/40 |
| 2009/0228202 | A1 * | 9/2009 | Wipplinger | G01C 23/00 701/467 |
| 2010/0030401 | A1 * | 2/2010 | Rogers | G08G 5/0039 701/3 |
| 2010/0250026 | A1 * | 9/2010 | Deker | G01C 23/00 715/810 |
| 2013/0046422 | A1 * | 2/2013 | Cabos | G08G 5/0021 701/120 |
| 2015/0199906 | A1 * | 7/2015 | Judy | G08G 5/0039 701/3 |
| 2017/0069213 | A1 * | 3/2017 | Thomas | G08G 5/0039 |
| 2017/0183105 | A1 * | 6/2017 | Fournier | B64D 45/00 |

(Continued)

*Primary Examiner* — Justin S Lee
(74) *Attorney, Agent, or Firm* — Joseph M. Butscher; The Small Patent Law Group LLC

(57) ABSTRACT

A system and method include a monitoring control unit configured to compare an initial flight plan, as generated by a flight planner for an aircraft, and an assessed flight plan, as determined by air traffic control. The monitoring control unit is configured to determine one or more differences between the initial flight plan and the assessed flight plan. The monitoring control unit is configured to output a notification signal to the flight planner regarding the one or more differences between the initial flight plan and the assessed flight plan.

20 Claims, 3 Drawing Sheets

(56) References Cited

U.S. PATENT DOCUMENTS

| | | | | |
|---|---|---|---|---|
| 2017/0233108 | A1* | 8/2017 | Kleywegt | G01M 1/125<br>701/29.1 |
| 2018/0082595 | A1* | 3/2018 | Hamilton | G08G 5/0039 |
| 2018/0239948 | A1* | 8/2018 | Rutschman | G06T 7/20 |
| 2018/0366010 | A1* | 12/2018 | Agam | G08G 5/0034 |
| 2019/0147748 | A1* | 5/2019 | Boozarjomehri | G08G 5/0039<br>701/120 |
| 2021/0192961 | A1* | 6/2021 | Lebbos | G08G 5/0039 |
| 2022/0013018 | A1* | 1/2022 | Schwindt | G08G 5/0021 |
| 2022/0238025 | A1* | 7/2022 | McCann | G08G 5/0039 |
| 2022/0250768 | A1* | 8/2022 | Oshima | B64D 1/02 |
| 2023/0040301 | A1* | 2/2023 | Da Conceicao | G06Q 50/40 |
| 2023/0057311 | A1* | 2/2023 | Moeykens | G08G 5/0052 |

* cited by examiner

SYSTEMS AND METHODS FOR MONITORING A FLIGHT PLAN OF AN AIRCRAFT

FIELD OF THE DISCLOSURE

Examples of the present disclosure generally relate to systems and methods for monitoring a flight plan (such as which is submitted to air traffic control) for an aircraft that is to fly from a departure location to an arrival location.

BACKGROUND OF THE DISCLOSURE

Aircraft are used to transport passengers and cargo between various locations. Numerous aircraft depart from and arrive at a typical airport every day.

Before an aircraft departs from an airport, a flight planner (for example, certified dispatchers, flight/mission planners, an actual flight crew, and/or the like) files or otherwise submits a flight plan, which includes a requested route from the location of the airport to a destination airport. Based on the flight plan, the flight crew determines an amount of fuel, a flight time, and various other aspects for the flight between the two locations.

The flight plan is submitted to air traffic control, such as located at the airport. Air traffic control personnel review the flight plan to determine whether or not the requested flight plan is acceptable and authorized. Air traffic control may modify the flight plan. In many cases, air traffic control may not actually respond to a flight planner or operator with a modified flight plan, but does publish the modified flight plan to general data feeds, such as managed by a regulatory agency (for example, the United States Federal Aviation Administration (FAA)).

A flight crew typically decides how much fuel to load on an aircraft, and reviews weather and other advisory information, based on a flight plan, which has been filed with air traffic control. As the flight crew prepares the aircraft for departure, air traffic control provides the flight crew with a clearance that may not match the flight plan, as filed, thereby leading to extra work for the flight crew to evaluate the new route. In certain cases, the flight crew may decide to add unnecessary fuel to the aircraft, and/or review extraneous information because of uncertainty in the route to a destination that may ultimately be assigned.

In general, the flight planner of the aircraft may not be informed of the modification to a flight plan until shortly before a scheduled departure, such as less than five minutes before a scheduled departure. As such, the flight planner may have a brief period of time to reassess various aspects for the flight, such as fuel, flight time, and the like.

SUMMARY OF THE DISCLOSURE

A need exists for a system and a method for monitoring modifications to a flight plan for an aircraft. Further, a need exists for a system and a method for notifying an operator of an aircraft of modifications to a proposed flight plan.

With those needs in mind, certain examples of the present disclosure provide a system including a monitoring control unit configured to compare an initial flight plan, as generated by a flight planner for an aircraft, and an assessed flight plan, as determined by air traffic control. The monitoring control unit is configured to determine one or more differences between the initial flight plan and the assessed flight plan. The monitoring control unit is configured to output a notification signal to the flight planner regarding the one or more differences between the initial flight plan and the assessed flight plan.

In at least one example, the air traffic control is configured to receive the initial flight plan from the flight planner, and determine the assessed flight plan from the initial flight plan.

In at least one example, the system also includes a flight plan publication sub-system in communication with the monitoring control unit and the air traffic control. The flight plan publication sub-system is configured to receive the assessed flight plan from the air traffic control. The flight plan publication sub-system is configured to publish the assessed flight plan. As an example, the flight plan publication sub-system includes a System Wide Information Management (SWIM) publication service.

In at least one example, in response to the monitoring control unit determining that the assessed flight plan matches the initial flight plan, the monitoring control unit is configured to inform the flight planner that the initial flight plan is approved.

In at least one example, the monitoring control unit is configured to automatically output the notification signal immediately, in real time, in response to determining the one or more differences. The one or more differences can include one or more of a different route between locations, an amount of fuel for a flight, a predicted fuel burn, a time of flight, available cargo capacity, and/or available passenger capacity.

In at least one example, the flight planner generates a revised initial flight in response to a review of the one or more differences between the initial flight plan and the assessed flight plan.

In at least one example, the system includes one or more robots configured to receive an aspect change signal from the flight planner. The aspect change signal is based on the assessed flight plan and includes one or more changes to one or more aspects of a flight of the aircraft. The one or more robots automatically change one or more aspects for the flight based on the aspect change signal. The one or more changes to the one or more aspects include one or more of reduction or addition of fuel, reduction or addition of cargo, or reduction or addition of passenger capacity.

Certain examples of the present disclosure provide a method including comparing, by a monitoring control unit, an initial flight plan, as generated by a flight planner for an aircraft, and an assessed flight plan, as determined by air traffic control; determining, by the monitoring control unit, one or more differences between the initial flight plan and the assessed flight plan; and outputting, by the monitoring control unit, a notification signal to the flight planner regarding the one or more differences between the initial flight plan and the assessed flight plan.

DETAILED DESCRIPTION OF THE DISCLOSURE

Figure 1:
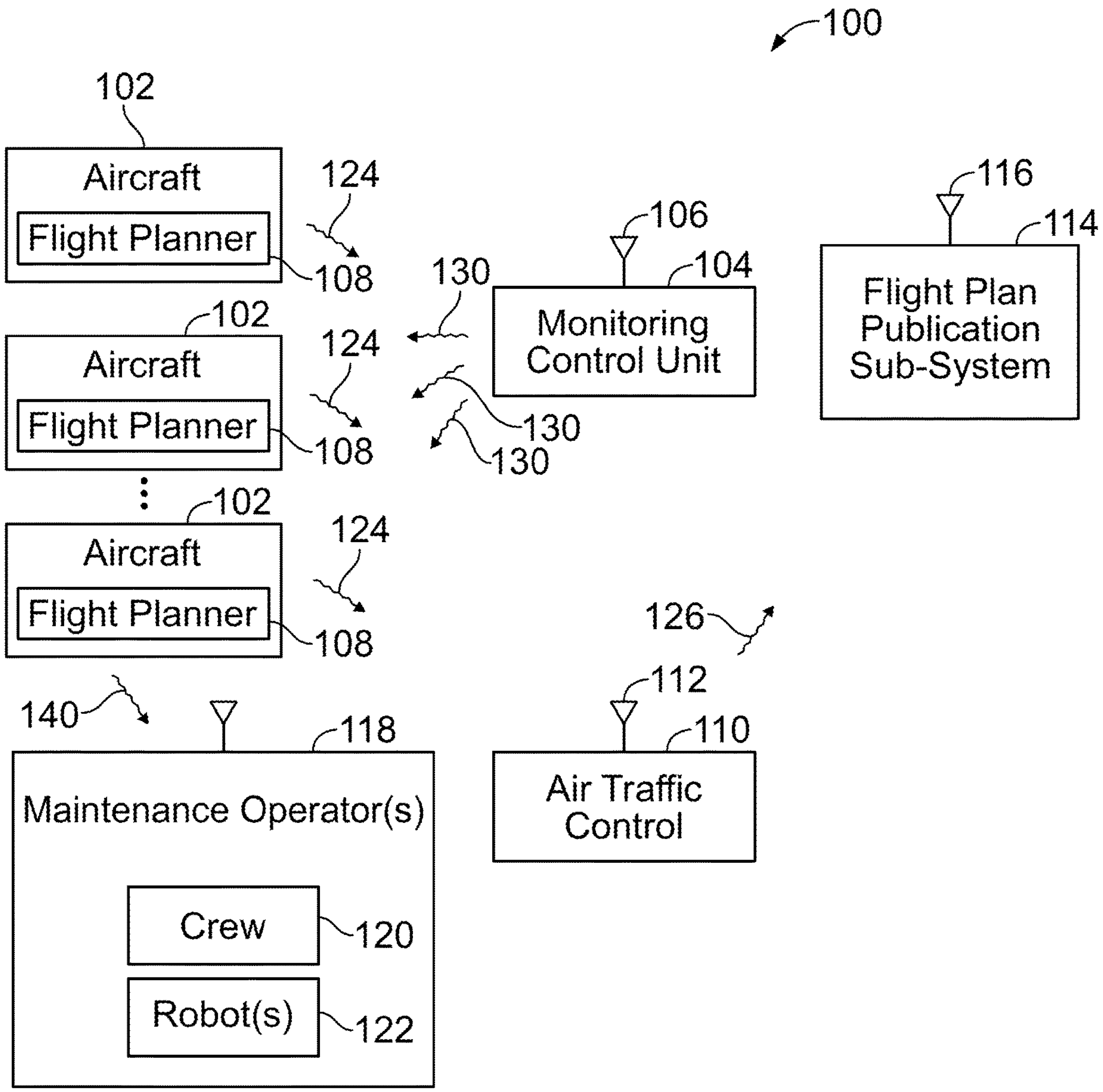
FIG. 1 illustrates a schematic block diagram of a system for monitoring a flight plan of an aircraft, according to an example of the present disclosure.

The foregoing summary, as well as the following detailed description of certain examples will be better understood when read in conjunction with the appended drawings. As used herein, an element or step recited in the singular and preceded by the word “a” or “an” should be understood as not necessarily excluding the plural of the elements or steps. Further, references to “one example” are not intended to be interpreted as excluding the existence of additional examples that also incorporate the recited features. Moreover, unless explicitly stated to the contrary, examples “comprising” or “having” an element or a plurality of elements having a particular condition can include additional elements not having that condition.

Knowing which route is more likely to be assigned for an aircraft ahead of time allows flight planners to more efficiently use their preparation time and more confidently reduce fuel loaded, which reduces total operating cost and might allow more cargo and/or passengers to be carried. Additionally, knowing the impact of the route air traffic control will assign in advance allows a flight planner (for example, a flight crew, a pilot, and/or an airline operator) to search for better alternatives, which may better meet operational needs, reduce fuel required for a flight, and/or achieve on-time flight departures.

Certain examples of the present disclosure provide a flight plan monitoring system and method. In at least one example, a flight planner (for example, pilot, flight crew personnel, aircraft operator, or other such individual and/or an automated agent) chooses an initial flight plan for an aircraft. The initial flight plan includes a desired route for a flight from a departure location to an arrival location. The initial flight plan is submitted to (for example, filed with) air traffic control (for example, air traffic control personnel and/or an agency associated with air traffic control). The initial flight plan provides an intent to operate the aircraft between the two different locations. In at least one example, the initial flight plan is not treated as a binding flight plan, as it may be modified.

After the flight plan is filed with air traffic control, a monitoring control unit monitors information published by one or more agencies (such as air traffic control, the FAA, and/or the like). The information includes the route the air traffic control intends to assign to the aircraft on departure. The monitoring control unit compares the initial flight plan, as submitted by the flight crew, with an assessed flight plan as determined by the air traffic control. If the monitoring control unit determines one or more differences between the initial flight plan and the assessed flight plan, the monitoring control unit outputs an alert to the flight crew of the differences, and how such differences affect various flight aspects for the flight. Example of the flight aspects include an amount of fuel for the aircraft, cargo and/or passenger capacity (for example, if less fuel is needed, additional cargo and/or passenger capacity may be available). If the monitoring control unit determines that the air traffic control intends to clear the aircraft on the same route filed (that is, the initial flight plan matches the assessed flight plan), the monitoring control unit notifies the flight crew, and the initial flight plan is sent to the flight crew of the aircraft to be used as the operational flight plan (that is, the actual flight plan that is to be used to fly from the departure location to the arrival location).

If, however, the monitoring control unit determines that the air traffic control intends to clear the aircraft on a different route (that is, the assessed flight plan includes one or more differences from the initial flight plan), the monitoring control unit automatically re-calculates a flight plan in relation to the assessed flight plan (as intended by the air traffic control), and outputs a signal including the assessed flight plan to the flight planner, including a comparison between the new flight plan (that is, the assessed flight plan) and the original flight plan (that is, the initial flight plan). The comparison may include the differences in total fuel required, planned fuel burn, planned flight time, operating cost, maximum available payload, and/or the like.

The flight crew can then choose to send the original plan to the flight planner with summary information about the assessed flight plan (for example, the different route and different fuel estimates). Optionally, the flight crew can send the new plan with information including differences from the original flight plan. Optionally, the flight crew can continue searching for a new option that is more favorable for the operating organization.

Examples of the present disclosure provide systems and methods that automatically monitor, recalculate, and compare flight plan data, thereby substantially reducing time and labor for a flight planner.

Examples of the present disclosure provide systems and methods for automatically updating flight plans with changes from air traffic control. In at least one example, the systems and methods use System-Wide Information Management (SWIM) data and recalculate required fuel, flight time, operating cost, and available payload. Examples of the present disclosure address the problem of air traffic control cleared routes differing from those in filed flight plans, which could otherwise create last-minute changes and uncertainty for pilots and planners.

FIG. 1 illustrates a schematic block diagram of a system 100 for monitoring a flight plan of an aircraft 102, according to an example of the present disclosure. The system 100 includes a monitoring control unit 104 in communication with one or more aircraft 102. The monitoring control unit 104 includes a communication device 106 that is configured to allow for communication between the monitoring control unit 104 and the aircraft 102. For example, the communication device 106 can be one or more of an antenna, a radio, a transceiver, a wired or wireless connection that allows for communication within a network, and/or the like. The monitoring control unit 104 can be in communication with more or less aircraft 102 than shown.

In at least one example, the monitoring control unit 104 is remotely located from the aircraft 102. As another example, the monitoring control unit 104 can be aboard an aircraft 102.

A flight planner 108 is associated with one or more of the aircraft 102. For example, each aircraft 102 can be associated with a separate and distinct flight planner 108. As another example, a single flight planner 108 can be associated with all of the aircraft 102. As another example, one flight planner 108 can be associated with a first subset of the aircraft 102, and another flight planner 108 can be associated with a second subset of the aircraft 102. The flight planner 108 can be a flight crew and/or pilot of an aircraft 102. As another example, the flight planner 108 can be one or more individuals at a location associated with an airline operator. In at least one example, the flight planner 108 can be an automated agent, such as a robot, which receives data and automatically determines an initial flight plan.

The monitoring control unit 104 is also in communication with air traffic control 110, such as at an airport from which the aircraft 102 are to depart. The air traffic control 110 includes a communication device 112 that allows for communication with the aircraft 102, the flight planners 108, and the monitoring control unit 104. Optionally, the monitoring control unit 104 is not in communication with the air traffic control 110. The monitoring control unit 104 can be remotely located from the air traffic control 110. Optionally, the monitoring control unit can be commonly located with the air traffic control 110, such as within a central monitoring station at an airport.

The monitoring control unit 104 is also in communication with a flight plan publication sub-system 114, which can also include a communication device 116 that allows for communication with the monitoring control unit 104 and the air traffic control 110. For example, the flight plan publication sub-system 114 can be in communication with the monitoring control unit 104 and the air traffic control 110 through one or more wired or wireless connections, such as through a private or public network. In at least one example, the monitoring control unit 104 and the air traffic control 110 are in communication with the flight plan publication sub-system 114 through the Internet. The monitoring control unit 104 can be remotely located from the flight plan publication sub-system 114. Optionally, the monitoring control unit can be commonly located with the flight plan publication sub-system 114, such as within a central monitoring station at an airport.

In at least one example, the flight plan publication sub-system 114 is a publicly available source of flight data that compiles and publishes the flight plan information for the aircraft 102. As an example, the flight plan publication sub-system 114 is a System Wide Information Management (SWIM) publication service, or other such service provided by the FAA. In at least one other example, the flight plan publication sub-system 114 can be another type of private or public messenger service that electronically provides data regarding assessed flight paths as generated and/or otherwise determined by the air traffic control 110. For example, the flight plan publication sub-system 114 can be a private or public messenger service of one or more airports, one or more flight monitoring centers, one or more regulatory agencies, and/or the like.

In at least one example, the monitoring control unit 104 is also in communication with one or more maintenance operators 118, such as through one or more wired or wireless connections. The maintenance operator(s) 118 can include a maintenance crew 120 and/or one or more robots 122.

In operation, a flight planner 108 for an aircraft 102 generates an initial flight plan for the aircraft 102. The initial flight plan includes a desired route between the departure airport and an arrival airport, and one or more of an amount of fuel for the desired route, cargo capacity, passenger capacity, and/or the like. The flight planner 108 outputs an initial flight plan signal 124 that includes the initial flight plan to the air traffic control 110. The air traffic control 110 receives the flight plan signal 124 including the initial flight plan. The monitoring control unit 104 also receives the flight plan signal 124 including the initial flight plan. Optionally, the monitoring control unit 104 can receive information regarding the initial flight plan from the air traffic control 110.

In response to receiving the initial flight plan from the flight planner 108, through the initial flight plan signal 124, the air traffic control 110 assesses the initial flight plan to determine if the initial flight plan is acceptable, based on various regulations (such as promulgated by the FAA), other flights in relation to the airports, and/or the like. The air traffic control 110 may or may not modify the initial flight plan. The air traffic control 110 outputs an assessed flight plan signal 126 to the flight plan publication sub-system 114. The assessed flight plan signal 126 includes an assessed flight plan as determined by the air traffic control 110. The assessed flight plan signal 126 may or may not differ from the initial flight plan, as generated by the flight planner 108.

The assessed flight plan, as received by the flight plan publication sub-system 114 via the assessed flight plan signal 126, is published by the flight plan publication sub-system 114, such as by way of an electronic publication on an internal or external network. For example, the flight plan publication sub-system 114 can publish the assessed flight plan for the aircraft on the Internet.

After the flight plan is filed with air traffic control, a monitoring control unit monitors information published by one or more agencies (such as air traffic control, the FAA, and/or the like). The information includes the route the air traffic control intends to assign to the aircraft on departure. The monitoring control unit compares the initial flight plan, as submitted by the flight crew, with an assessed flight plan as determined by the air traffic control. If the monitoring control unit determines one or more differences between the initial flight plan and the assessed flight plan, the monitoring control unit outputs an alert to the flight crew of the differences, and how such differences affect various flight aspects for the flight. Examples of the flight aspects include an amount of fuel for the aircraft, cargo and/or passenger capacity (for example, if less fuel is needed, additional cargo and/or passenger capacity may be available). If the monitoring control unit determines that the air traffic control intends to clear the aircraft on the same route filed (that is, the initial flight plan matches the assessed flight plan), the monitoring control unit notifies the flight crew, and the initial flight plan is sent to the flight crew of the aircraft to be used as the operational flight plan (that is, the actual flight plan that is to be used to fly from the departure location to the arrival location).

In at least one example, the monitoring control unit 104 continually automatically monitors the assessed flight plan as published by the flight plan publication sub-system 114. In at least one example, the monitoring control unit 104 automatically outputs the notification signal 130 immediately, in real time, or otherwise substantially quickly (such as within 2 minutes or less) in response to determining at least one difference (for example, a change or other such modification) between the assessed flight plan and the initial flight plan.

If during the comparison, however, the monitoring control unit 104 determines one or more differences between the assessed flight plan and the initial flight plan, the monitoring control unit 104 outputs the notification signal 130 that indicates the difference(s) therebetween. For example, the assessed flight plan can differ from the initial flight plan in relation to one or more of a different route between locations, an amount of fuel for the flight, a predicted fuel burn, a time of flight, available cargo capacity, available passenger capacity, and/or the like. In this example, the flight planner 108 can then determine that the aircraft 102 should fly according to the assessed flight plan. Optionally, the flight planner 108 can generate a revised initial flight plan, and the system and method operate as described above.

Based on the one or more difference(s) between the assessed flight plan and the initial flight plan, the flight planner 108 can reassess various aspects of the flight from the departure location and the arrival location. For example, based on the differences between the assessed flight plan and the initial flight plan, the flight planner 108 may change one or more aspects for the flight of the aircraft, such as reducing or increasing fuel, reducing or adding cargo capacity, reducing or adding passenger capacity, and/or the like.

In at least one example, the flight planner 108 outputs an aspect change signal 140 to the maintenance operator(s) 118 and/or anyone else in a flight control role. The aspect change signal 140 is based on the assessed flight plan and includes one or more changes to certain aspects of the flight of the aircraft 102. The aspect change signal 140 can include information regarding reduction or addition of fuel, reduction or addition of cargo, reduction or addition of passenger capacity, and/or the like. The maintenance operator(s) 118 receive the aspect change signal 140 and modify aspects for the flight accordingly. For example, one or more robots 122 receive the aspect change signal 140 and automatically change aspects for the flight. As a further example, based on the aspect change signal 140, which is based on the assessed flight plan as monitored by the monitoring control unit 104, the robot(s) 122 can automatically add or remove fuel in relation to the aircraft, automatically add or remove cargo from the aircraft, and/or the like.

As described herein, the system 100 includes the monitoring control unit 104, which is configured to compare an initial flight plan, as generated by a flight planner 108 for an aircraft 102, and an assessed flight plan, as determined by air traffic control 110. The monitoring control unit 104 is configured to determine one or more differences between the initial flight plan and the assessed flight plan. Further, the monitoring control unit 104 is configured to output a notification signal 130 to the flight planner 108 regarding the one or more differences between the initial flight plan and the assessed flight plan.

In at least one example, the air traffic control 110 receives the initial flight plan from the flight planner 108. The air traffic control 110 determines the assessed flight plan from the initial flight plan. For example, the air traffic control 110 reviews the initial flight plan and determines whether or not the initial flight plan is acceptable in view of one or more regulations (such as promulgated by the FAA), weather conditions between the departure location and the arrival location, air traffic conditions between the locations (such as a number of flights and their respective paths), and/or the like. If acceptable, the air traffic control 110 submits the initial flight plan as the assessed flight plan. If not acceptable, the air traffic control 110 modifies or otherwise replaces the initial flight plan, and submits the modified or replacement flight plan as the assessed flight plan.

In at least one example, the flight plan publication sub-system 114 is in communication with the monitoring control unit 104 and the air traffic control 110. The flight plan publication sub-system 114 receives the assessed flight plan from the air traffic control 110. Further, the flight plan publication sub-system 114 publishes the assessed flight plan, such as electronically on an electronic messenger service.

The flight planner 108 can decide to operate the aircraft 102 according to the initial flight plan or the assessed flight plan (if it differs from the initial flight plan). As another example, the flight planner 108 can generate a revised initial flight in response to a review of the one or more differences between the initial flight plan and the assessed flight plan.

As used herein, the term "control unit," "central processing unit," "CPU," "computer," or the like may include any processor-based or microprocessor-based system including systems using microcontrollers, reduced instruction set computers (RISC), application specific integrated circuits (ASICs), logic circuits, and any other circuit or processor including hardware, software, or a combination thereof capable of executing the functions described herein. Such are exemplary only, and are thus not intended to limit in any way the definition and/or meaning of such terms. For example, the monitoring control unit 104 may be or include one or more processors that are configured to control operation, as described herein.

The monitoring control unit 104 is configured to execute a set of instructions that are stored in one or more data storage units or elements (such as one or more memories), in order to process data. For example, the monitoring control unit 104 may include or be coupled to one or more memories. The data storage units may also store data or other information as desired or needed. The data storage units may be in the form of an information source or a physical memory element within a processing machine.

The set of instructions may include various commands that instruct the monitoring control unit 104 as a processing machine to perform specific operations such as the methods and processes of the various examples of the subject matter described herein. The set of instructions may be in the form of a software program. The software may be in various forms such as system software or application software. Further, the software may be in the form of a collection of separate programs, a program subset within a larger program, or a portion of a program. The software may also include modular programming in the form of object-oriented programming. The processing of input data by the processing machine may be in response to user commands, or in response to results of previous processing, or in response to a request made by another processing machine.

The diagrams of examples herein may illustrate one or more control or processing units, such as the monitoring control unit 104. It is to be understood that the processing or control units may represent circuits, circuitry, or portions thereof that may be implemented as hardware with associated instructions (e.g., software stored on a tangible and non-transitory computer readable storage medium, such as a computer hard drive, ROM, RAM, or the like) that perform the operations described herein. The hardware may include state machine circuitry hardwired to perform the functions described herein. Optionally, the hardware may include electronic circuits that include and/or are connected to one or more logic-based devices, such as microprocessors, processors, controllers, or the like. Optionally, the monitoring control unit 104 may represent processing circuitry such as one or more of a field programmable gate array (FPGA), application specific integrated circuit (ASIC), microprocessor(s), and/or the like. The circuits in various examples may be configured to execute one or more algorithms to perform functions described herein. The one or more algorithms may include aspects of examples disclosed herein, whether or not expressly identified in a flowchart or a method.

As used herein, the terms "software" and "firmware" are interchangeable, and include any computer program stored in a data storage unit (for example, one or more memories) for execution by a computer, including RAM memory, ROM memory, EPROM memory, EEPROM memory, and non-volatile RAM (NVRAM) memory. The above data storage unit types are exemplary only, and are thus not limiting as to the types of memory usable for storage of a computer program.

Figure 2:
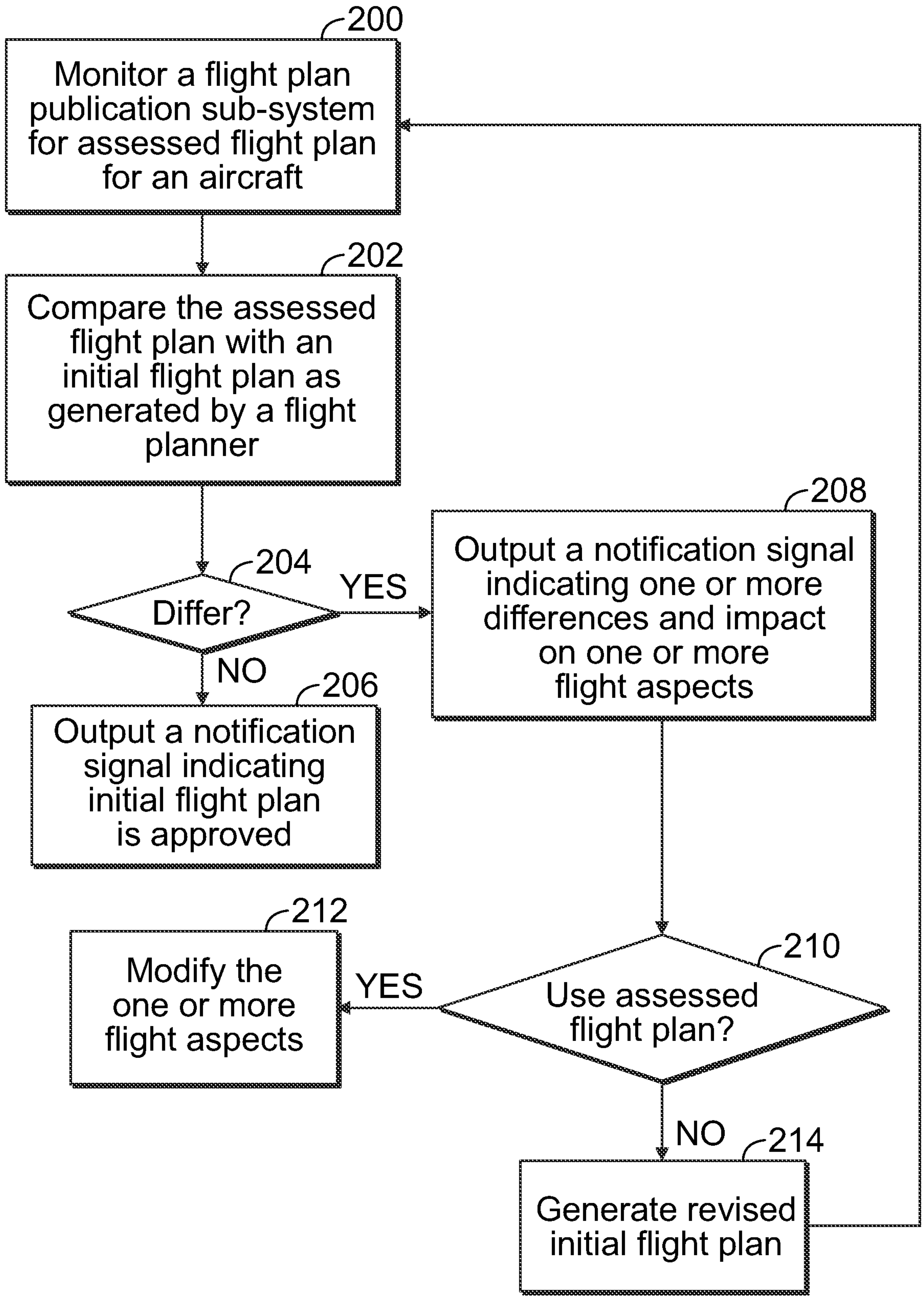
FIG. 2 illustrates a flow chart of a method for monitoring a flight plan of an aircraft, according to an example of the present disclosure.

FIG. 2 illustrates a flow chart of a method for monitoring a flight plan of an aircraft, according to an example of the present disclosure. Referring to FIGS. 1 and 2, the monitoring control unit 104 is in communication with the flight plan publication sub-system 114. At 200, the monitoring control unit monitors the flight plan publication sub-system 114 for an assessed flight plan for an aircraft 102. At 202, the monitoring control unit 104 compares the assessed flight plan (as generated by the air traffic control 110) with an initial flight plan as generated by a flight planner 108 for the aircraft 102.

At 204, the monitoring control unit 104 determines, based on the comparison, if there is one or more difference between the assessed flight plan and the initial flight plan. If there are no differences at 204, the method proceeds to 206, at which the monitoring control unit 104 outputs a notification signal 130 indicating that the initial flight plan is approved. The aircraft 102 may then fly from the departure location to the arrival location according to the initial flight plan, which is approved as the operational flight plan for flight.

If however, the monitoring control unit 104, based on the comparison, determines one or more differences between the assessed flight plan and the initial flight plan, the method proceeds from 204 to 208, at which the monitoring control unit 104 outputs a notification signal indicating the one or more differences therebetween, and an impact one or more flight aspects for the aircraft 102 due to the one or more differences. At 210, the flight planner 108 can then determine whether or not to use the assessed flight plan. If, at 210, the flight planner 108 decides that the aircraft 102 should fly according to the assessed flight plan, the method proceeds to 212, at which one or more flight aspects (for example, a route between locations, an amount of fuel for the flight, cargo capacity, passenger capacity, and/or the like) for the aircraft 102 are modified.

If, however, the flight planner 108 decides not to use the assessed flight plan at 210, the method proceeds to 214, at which the flight planner 108 generates a revised initial flight plan for the aircraft 102. The process then returns to 200.

Examples of the subject disclosure provide systems and methods that allow large amounts of data to be quickly and efficiently analyzed by a computing device. For example, the monitoring control unit 104 can monitor initial flight plans and assessed flight plans for dozens if not hundreds of aircraft 102. Further, the monitoring control unit 104 assesses data generated by the flight plan publication sub-system 114 which can be in a format not readily discernable by a human being. As such, large amounts of data, which may not be discernable by human beings, are being tracked and analyzed. The vast amounts of data are efficiently organized and/or analyzed by the monitoring control unit 104, as described herein. The monitoring control unit 104 analyzes the data in a relatively short time in order to quickly and efficiently determine differences between initial flight plans and assessed flight plans, generate notifications in real time, and the like. A human being would be incapable of efficiently analyzing such vast amounts of data in such a short time. As such, examples of the subject disclosure provide increased and efficient functionality, and vastly superior performance in relation to a human being analyzing the vast amounts of data.

In at least one embodiment, components of the system 100, such as the monitoring control unit 104, provide and/or enable a computer system to operate as a special computer system for monitoring and comparing flight plans for aircraft that are scheduled to depart an airport.

Figure 3:
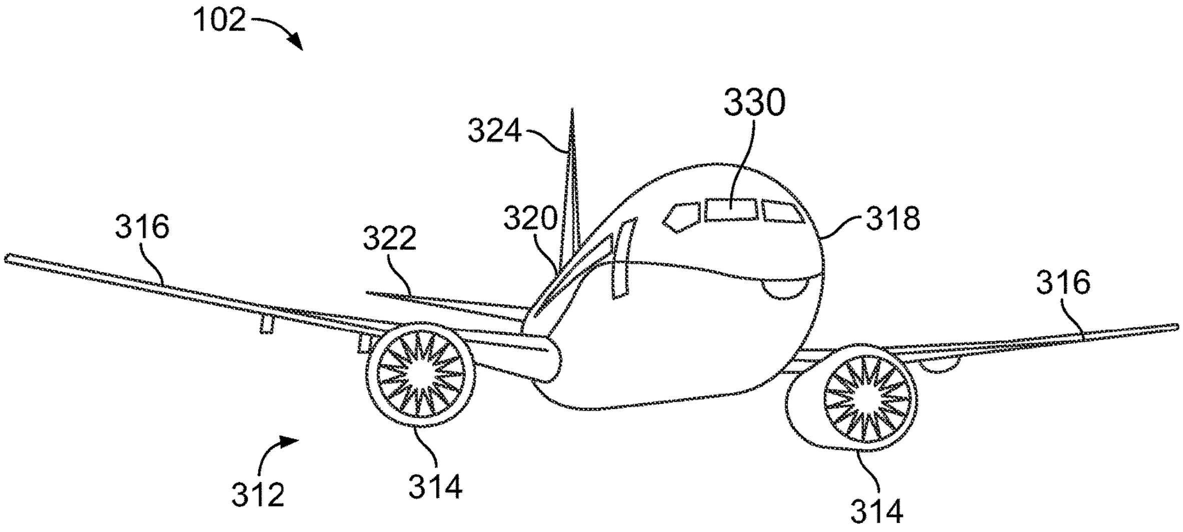
FIG. 3 illustrates a perspective front view of an aircraft, according to an example of the present disclosure.

FIG. 3 illustrates a perspective front view of an aircraft 102, according to an example of the present disclosure. The aircraft 102 includes a propulsion system 312 that includes engines 314, for example. Optionally, the propulsion system 312 may include more engines 314 than shown. The engines 314 are carried by wings 316 of the aircraft 102. In other embodiments, the engines 314 may be carried by a fuselage 318 and/or an empennage 320. The empennage 320 may also support horizontal stabilizers 322 and a vertical stabilizer 324. The fuselage 318 of the aircraft 102 defines an internal cabin 330, which includes a flight deck or cockpit, one or more work sections (for example, galleys, personnel carry-on baggage areas, and the like), one or more passenger sections (for example, first class, business class, and coach sections), one or more lavatories, and/or the like.

FIG. 3 shows an example of an aircraft 102. It is to be understood that the aircraft 102 can be sized, shaped, and configured differently than shown in FIG. 3. Further, the aircraft 102 shown and described with respect to FIG. 1 can be configured as shown in FIG. 3. Optionally, one or more of the aircraft 102 shown and described with respect to FIG. 1 can be sized, shaped and configured differently than shown in FIG. 3.

Further, the disclosure comprises examples according to the following clauses:

Clause 1. A system comprising:

a monitoring control unit configured to compare an initial flight plan, as generated by a flight planner for an aircraft, and an assessed flight plan, as determined by air traffic control, wherein the monitoring control unit is configured to determine one or more differences between the initial flight plan and the assessed flight plan, and wherein the monitoring control unit is configured to output a notification signal to the flight planner regarding the one or more differences between the initial flight plan and the assessed flight plan.

Clause 2. The system of Clause 1, wherein the air traffic control is configured to receive the initial flight plan from the flight planner, and determine the assessed flight plan from the initial flight plan.

Clause 3. The system of Clauses 1 or 2, further comprising a flight plan publication sub-system in communication with the monitoring control unit and the air traffic control, wherein the flight plan publication sub-system is configured to receive the assessed flight plan from the air traffic control, and wherein the flight plan publication sub-system is configured to publish the assessed flight plan.

Clause 4. The system of Clause 3, wherein the flight plan publication sub-system comprises a System Wide Information Management (SWIM) publication service.

Clause 5. The system of any of Clauses 1-4, wherein, in response to the monitoring control unit determining that the assessed flight plan matches the initial flight plan, the monitoring control unit is configured to inform the flight planner that the initial flight plan is approved.

Clause 6. The system of any of Clauses 1-5, wherein the monitoring control unit is configured to automatically output the notification signal immediately, in real time, in response to determining the one or more differences.

Clause 7. The system of any of Clauses 1-6, wherein the one or more differences comprise one or more of a different route between locations, an amount of fuel for a flight, a predicted fuel burn, a time of flight, available cargo capacity, or available passenger capacity.

Clause 8. The system of any of Clauses 1-7, wherein the flight planner generates a revised initial flight in response to a review of the one or more differences between the initial flight plan and the assessed flight plan.

Clause 9. The system of any of Clauses 1-8, further comprising one or more robots, wherein the one or more robots are configured to receive an aspect change signal from the flight planner, wherein the aspect change signal is based on the assessed flight plan and comprises one or more changes to one or more aspects of a flight of the aircraft, and wherein the one or more robots are configured to automatically change one or more aspects for the flight based on the aspect change signal.

Clause 10. The system of Clause 9, wherein the one or more changes to the one or more aspects comprises one or more of reduction or addition of fuel, reduction or addition of cargo, or reduction or addition of passenger capacity.

Clause 11. A method comprising:

comparing, by a monitoring control unit, an initial flight plan, as generated by a flight planner for an aircraft, and an assessed flight plan, as determined by air traffic control;

determining, by the monitoring control unit, one or more differences between the initial flight plan and the assessed flight plan; and outputting, by the monitoring control unit, a notification signal to the flight planner regarding the one or more differences between the initial flight plan and the assessed flight plan.

Clause 12. The method of Clause 11, further comprising:

receiving, by the air traffic control, the initial flight plan from the flight planner; and determining, by the air traffic control, the assessed flight plan from the initial flight plan.

Clause 13. The method of Clauses 11 or 12, further comprising:

receiving, by a flight plan publication sub-system in communication with the monitoring control unit and the air traffic control, the assessed flight plan from the air traffic control; and publishing, by the flight plan publication sub-system, the assessed flight plan.

Clause 14. The method of Clause 13, wherein the flight plan publication sub-system comprises a System Wide Information Management (SWIM) publication service.

Clause 15. The method of any of Clauses 11-14, wherein, in response to the monitoring control unit determining that the assessed flight plan matches the initial flight plan, informing, by the monitoring control unit, the flight planner that the initial flight plan is approved.

Clause 16. The method of any of Clauses 11-15, wherein said outputting comprises automatically outputting the notification signal immediately, in real time, in response to determining the one or more differences.

Clause 17. The method of any of Clauses 11-16, wherein the one or more differences comprise one or more of a different route between locations, an amount of fuel for a flight, a predicted fuel burn, a time of flight, available cargo capacity, or available passenger capacity.

Clause 18. The method of any of Clauses 11-17, further comprising generating, by the flight planner, a revised initial flight in response to a review of the one or more differences between the initial flight plan and the assessed flight plan.

Clause 19. The method of any of Clauses 11-18, further comprising:

receiving, by one or more robots, an aspect change signal from the flight planner, wherein the aspect change signal is based on the assessed flight plan and comprises one or more changes to one or more aspects of a flight of the aircraft; and automatically changing, by the one or more robots, one or more aspects for the flight based on the aspect change signal.

Clause 20. A system comprising:

a monitoring control unit configured to compare initial flight plans, as generated by one or more flight planners for a plurality of aircraft, and assessed flight plans, as determined by air traffic control; and a flight plan publication sub-system in communication with the monitoring control unit and the air traffic control, wherein the air traffic control is configured to receive the initial flight plans from the one or more flight planners, and determine the assessed flight plans from the initial flight plans, wherein the flight plan publication sub-system is configured to receive the assessed flight plans from the air traffic control, wherein the flight plan publication sub-system is configured to publish the assessed flight plans, wherein the monitoring control unit is configured to determine one or more differences between the initial flight plans and the assessed flight plans, and wherein the monitoring control unit is configured to output notification signals to the one or more flight planners regarding the one or more differences between the initial flight plans and the assessed flight plans.

As described herein, examples of the present disclosure provide systems and methods for monitoring modifications to a flight plan for an aircraft. Further, examples of the present disclosure provide systems and methods for notifying an operator of an aircraft of modifications to a proposed flight plan.

While various spatial and directional terms, such as top, bottom, lower, mid, lateral, horizontal, vertical, front and the like can be used to describe examples of the present disclosure, it is understood that such terms are merely used with respect to the orientations shown in the drawings. The orientations can be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described examples (and/or aspects thereof) can be used in combination with each other. In addition, many modifications can be made to adapt a particular situation or material to the teachings of the various examples of the disclosure without departing from their scope. While the dimensions and types of materials described herein are intended to define the parameters of the various examples of the disclosure, the examples are by no means limiting and are exemplary examples. Many other examples will be apparent to those of skill in the art upon reviewing the above description. The scope of the various examples of the disclosure should, therefore, be determined with reference to the appended claims, along with the full scope of equivalents to which such claims are entitled. In the appended claims and the detailed description herein, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various examples of the disclosure, including the best mode, and also to enable any person skilled in the art to practice the various examples of the disclosure, including making and using any devices or systems and performing any incorporated methods. The patentable scope of the various examples of the disclosure is defined by the claims, and can include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A system comprising:

a monitoring control unit including one or more processors configured to compare an initial flight plan, as generated by a flight planner for an aircraft, and an assessed flight plan, as determined by air traffic control, wherein the initial flight plan includes (a) a desired route for a flight from a departure location to an arrival location, (b) an amount of fuel for the desired route, (c) available cargo capacity, and (d) available passenger capacity, and wherein the initial flight plan provides an intent to operate the aircraft between the departure location and the arrival location, wherein the initial flight plan is submitted by the flight planner to the air traffic control for assessment, wherein the monitoring control unit is configured to:

determine one or more differences between the initial flight plan and the assessed flight plan, continually automatically monitor information published by a flight plan publication sub-system in real time, wherein the monitoring control unit monitors and receives the information in real time from the flight plan publication sub-system as the information is published, wherein the information includes a route the air traffic control intends to assign to the aircraft on departure, and wherein the information is not sent by the air traffic control to the aircraft, and output a notification signal to the flight planner regarding information including the one or more differences between the initial flight plan and the assessed flight plan.

2. The system of claim 1, wherein the air traffic control is configured to receive the initial flight plan from the flight planner, and determine the assessed flight plan from the initial flight plan.

3. The system of claim 1, wherein the flight plan publication sub-system is configured to receive the assessed flight plan from the air traffic control, and wherein the flight plan publication sub-system is configured to publish the information including the assessed flight plan.

4. The system of claim 3, wherein the flight plan publication sub-system comprises a System Wide Information Management (SWIM) publication service.

5. The system of claim 1, wherein, in response to the monitoring control unit determining that the assessed flight plan matches the initial flight plan, the monitoring control unit is configured to inform the flight planner that the initial flight plan is approved.

6. The system of claim 1, wherein the monitoring control unit is configured to automatically output the notification signal immediately, in real time, in response to determining the one or more differences.

7. The system of claim 1, wherein the one or more differences comprise a different route between the departure location and the arrival location, an amount of fuel for the flight, a predicted fuel burn, a time of the flight, the available cargo capacity, and the available passenger capacity.

8. The system of claim 1, wherein the flight planner generates a revised initial flight in response to a review of the one or more differences between the initial flight plan and the assessed flight plan.

9. The system of claim 1, further comprising one or more robots, wherein the one or more robots are configured to receive an aspect change signal from the flight planner, wherein the aspect change signal is based on the assessed flight plan and comprises one or more changes to one or more aspects of a flight of the aircraft, and wherein the one or more robots are configured to automatically change one or more aspects for the flight based on the aspect change signal.

10. The system of claim 9, wherein the one or more changes to the one or more aspects comprises reduction or addition of fuel, reduction or addition of cargo, and reduction or addition of passenger capacity.

11. A method comprising:

comparing, by a monitoring control unit including one or more processors, an initial flight plan, as generated by a flight planner for an aircraft, and an assessed flight plan, as determined by air traffic control, wherein the initial flight plan includes (a) a desired route for a flight from a departure location to an arrival location, (b) an amount of fuel for the desired route, (c) available cargo capacity, and (d) available passenger capacity, and wherein the initial flight plan provides an intent to operate the aircraft between the departure location and the arrival location;

continually automatically monitoring, by the monitoring control unit, information published by a flight plan publication sub-system, wherein the information includes a route the air traffic control intends to assign to the aircraft on departure, and wherein the information is not sent by the air traffic control to the aircraft, and wherein said continually automatically monitoring comprises receiving and monitoring the information in real time from the flight plan publication sub-system as the information is published;

determining, by the monitoring control unit, one or more differences between the initial flight plan and the assessed flight plan; and outputting, by the monitoring control unit, a notification signal to the flight planner regarding the information including the one or more differences between the initial flight plan and the assessed flight plan.

12. The method of claim 11, further comprising:

receiving, by the air traffic control, the initial flight plan from the flight planner; and determining, by the air traffic control, the assessed flight plan from the initial flight plan.

13. The method of claim 11, further comprising:

receiving, by the flight plan publication sub-system in communication with the monitoring control unit and the air traffic control, the assessed flight plan from the air traffic control; and publishing, by the flight plan publication sub-system, the information including the assessed flight plan.

14. The method of claim 13, wherein the flight plan publication sub-system comprises a System Wide Information Management (SWIM) publication service.

15. The method of claim 11, wherein, in response to the monitoring control unit determining that the assessed flight plan matches the initial flight plan, informing, by the monitoring control unit, the flight planner that the initial flight plan is approved.

16. The method of claim 11, wherein said outputting comprises automatically outputting the notification signal immediately, in real time, in response to determining the one or more differences.

17. The method of claim 11, wherein the one or more differences comprise a different route between the departure location and the arrival location, an amount of fuel for the flight, a predicted fuel burn, a time of the flight, the available cargo capacity, and the available passenger capacity.

18. The method of claim 11, further comprising generating, by the flight planner, a revised initial flight in response to a review of the one or more differences between the initial flight plan and the assessed flight plan.

19. The method of claim 11, further comprising:

receiving, by one or more robots, an aspect change signal from the flight planner, wherein the aspect change signal is based on the assessed flight plan and comprises one or more changes to one or more aspects of a flight of the aircraft; and automatically changing, by the one or more robots, one or more aspects for the flight based on the aspect change signal.

20. A system comprising:

a monitoring control unit including one or more processors configured to compare initial flight plans, as generated by one or more flight planners for a plurality of aircraft, and assessed flight plans, as determined by air traffic control, wherein each of the initial flight plans include (a) a desired route for a flight from a departure location to an arrival location, (b) an amount of fuel for the desired route, (c) available cargo capacity, and (d) available passenger capacity, and wherein each of the initial flight plans provide an intent to operate the aircraft between the departure location and the arrival location, wherein the initial flight plans are submitted by the one or more flight planners to the air traffic control for assessment; and a flight plan publication sub-system in communication with the monitoring control unit and the air traffic control, wherein the air traffic control is configured to receive the initial flight plans from the one or more flight planners, and determine the assessed flight plans from the initial flight plans, wherein the flight plan publication sub-system is configured to receive the assessed flight plans from the air traffic control, wherein the flight plan publication sub-system is configured to publish the assessed flight plans, wherein the monitoring control unit is configured to:

determine one or more differences between the initial flight plans and the assessed flight plans, continually automatically monitor information published by the flight plan publication sub-system in real time, wherein the monitoring control unit monitors and receives the information in real time from the flight plan publication sub-system as the information is published, wherein the information includes a route the air traffic control intends to assign to the aircraft on departure, and wherein the information is not sent by the air traffic control to the aircraft, and output notification signals to the one or more flight planners regarding the information including one or more differences between the initial flight plans and the assessed flight plans.

* * * * *